US012706892B2

(12) United States Patent
Stayskal et al.

(10) Patent No.: US 12,706,892 B2
(45) Date of Patent: Aug. 11, 2026

(54) SECURE TRANSFER OF WORKLOADS ACROSS SECURITY REGIONS

(71) Applicant: Oracle International Corporation, Redwood Shores, CA (US)

(72) Inventors: Danne Lauren Stayskal, Eastsound, WA (US); Robert Thomas Schumaker, Redmond, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/770,494

(22) Filed: Jul. 11, 2024

(65) Prior Publication Data

US 2024/0364668 A1 Oct. 31, 2024

Related U.S. Application Data

(63) Continuation of application No. 17/538,853, filed on Nov. 30, 2021, now Pat. No. 12,063,206.

(51) Int. Cl.
*H04L 9/40* (2022.01)

(52) U.S. Cl.
CPC ........ *H04L 63/0471* (2013.01); *H04L 63/123* (2013.01); *H04L 63/18* (2013.01)

(58) Field of Classification Search
CPC ... H04L 63/0471; H04L 63/123; H04L 63/18; H04L 63/0428; H04L 63/12; H04L 63/0823; G06F 2009/45587; G06F 9/45558; G06F 2009/4557
See application file for complete search history.

(56) References Cited

U.S. PATENT DOCUMENTS 8,037,187 B2 10/2011 Dawson et al.
10,511,593 B2 * 12/2019 Appiah ................. G06F 16/951
11,388,054 B2 * 7/2022 Guim Bernat ........ H04L 9/3247
2014/0208111 A1 * 7/2014 Brandwine ........... H04L 9/0844 713/171
2018/0359238 A1 * 12/2018 Appiah ............... H04L 63/0853
2019/0042319 A1 * 2/2019 Sood ....................... G06F 21/74
2019/0332421 A1 * 10/2019 Kozlowski ............ G06F 9/4856
2020/0057664 A1 * 2/2020 Durham .................. G06F 21/53
2020/0136906 A1 * 4/2020 Guim Bernat ........ H04L 9/3213
2021/0021585 A1 1/2021 Rahman et al.

(Continued)

FOREIGN PATENT DOCUMENTS

CN 106341228 B 6/2019
JP 2016509806 A 3/2016
WO 2020083891 A1 4/2020

OTHER PUBLICATIONS

Oracle Cloud Administering Oracle Database Exadata Cloud Service (OCI-C), Release 19.3.1, Jul. 31, 2021, 246 pages.

(Continued)

*Primary Examiner* — J. Brant Murphy
(74) *Attorney, Agent, or Firm* — Kilpatrick Townsend & Stockton LLP

(57) ABSTRACT

A framework for transferring workloads between security regions of an infrastructure service. For example, techniques for transferring workloads between security regions across a private network based on signatures associated with the security regions.

20 Claims, 10 Drawing Sheets

(56) References Cited

U.S. PATENT DOCUMENTS

| | | | | |
|---|---|---|---|---|
| 2021/0144517 | A1* | 5/2021 | Guim Bernat | G06F 9/5072 |
| 2022/0078026 | A1* | 3/2022 | Flynn | G06F 21/44 |

OTHER PUBLICATIONS

U.S. Appl. No. 17/538,853, Non-Final Office Action mailed on Oct. 5, 2023, 7 pages.
U.S. Appl. No. 17/538,853, Notice of Allowance mailed on Apr. 17, 2024, 10 pages.
International Application No. PCT/US2022/023535, International Search Report and Written Opinion mailed on Aug. 17, 2022, 15 pages.
Yeluri et al., "Building the Infrastructure for Cloud Security", A Solution View, Dec. 31, 2014, 240 pages.
IN202447032419 , "First Examination Report", Aug. 1, 2025, 8 pages.
Kumar et al., "Enhancing Data Security using Digital Signature in Cloud Computing", Dec. 12, 2019.
Application No. PCT/US2022/023535 , International Preliminary Report on Patentability, Mailed on Jun. 13, 2024, 11 pages.
Zhang et al., "A Secure and Lightweight Certificateless Hybrid Signcryption Scheme for Industrial Internet of Things", Sep. 1, 2021.
Japanese Application No. 2024-529774, Office Action mailed on Jan. 20, 2026, 4 pages.
JP2024-529774 , "Notice of Decision to Grant", Jun. 16, 2026, 5 pages.
KR10-2024-7021638 , "Office Action", Jun. 10, 2026, 13 pages.

* cited by examiner

SECURE TRANSFER OF WORKLOADS ACROSS SECURITY REGIONS

CROSS-REFERENCE TO RELATED APPLICATIONS

This application is a continuation of U.S. nonprovisional application Ser. No. 17/538,853, filed Nov. 30, 2021, the entire contents of which is incorporated herein by reference for all purposes.

BACKGROUND

A cloud service provider (CSP) provides a variety of services to users or customers on demand using different systems and infrastructure services. The CSP provides infrastructure services that can be used by customers to build their own networks and deploy customer resources. In some instances, the customer may define one or more secure regions for their own networks utilizing the CSP.

Legacy approaches for transferring workloads between classified regions within a CSP is completely manual. In particular, a user would be required to physically connect a computer system to a first classified region from which a workload is to be transferred. The user would copy the workload from the first classified region to the computer system and then disconnect the workload from the first classified region. The user would then physically connect the computer system to a second classified region to which the workload is to be transferred. The user would then upload the workload to the second classified region.

SUMMARY

The present disclosure relates generally to a framework for transferring workloads and/or other data between classified regions. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to a method for providing a workload from a first security region of a cloud service provider (CSP) to a second security region of the cloud service provider. The method may include receiving, via a device, the workload from the first security region, and verifying, via the device, one or more signatures of the workload, the one or more signatures comprising at least one signature associated with the first security region and at least one signature associated with the second security region. The method may further include encrypting, via the device, the workload based at least in part on the one or more signatures of the workload being verified, and transmitting, via the device, the encrypted workload to the second security region.

An aspect of the present disclosure is directed to one or more computer-readable media having instructions stored thereon, wherein the instructions, when executed by a network, cause the network to receive, via a device of the network, a workload from a first security region of a cloud service provider (CSP), and verify, via the device, one or more signatures of the workload, the one or more signatures comprising at least one signature associated with the first security region and at least one signature associated with a second security region. The instructions, when executed by the network, may further cause the network to encrypt, via the device, the workload based at least in part on the one or more signatures of the workload being verified, and transmit, via the device, the encrypted workload to the second security region of the cloud service provider.

An aspect of the present disclosure is directed to a private network, which includes a private network connection connected between a first security region of a cloud service provider (CSP) and a second security region of the cloud service provider, and a device coupled to the private network connection and located at the first security region. The device may receive a workload from the first security region, and verify one or more signatures of the workload, the one or more signatures comprising at least one signature associated with the first security region and at least one signature associated with the second security region. The device may further encrypt the workload based at least in part on the one or more signatures of the workload being verified, and transmit the encrypted workload to the second security region.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 6:
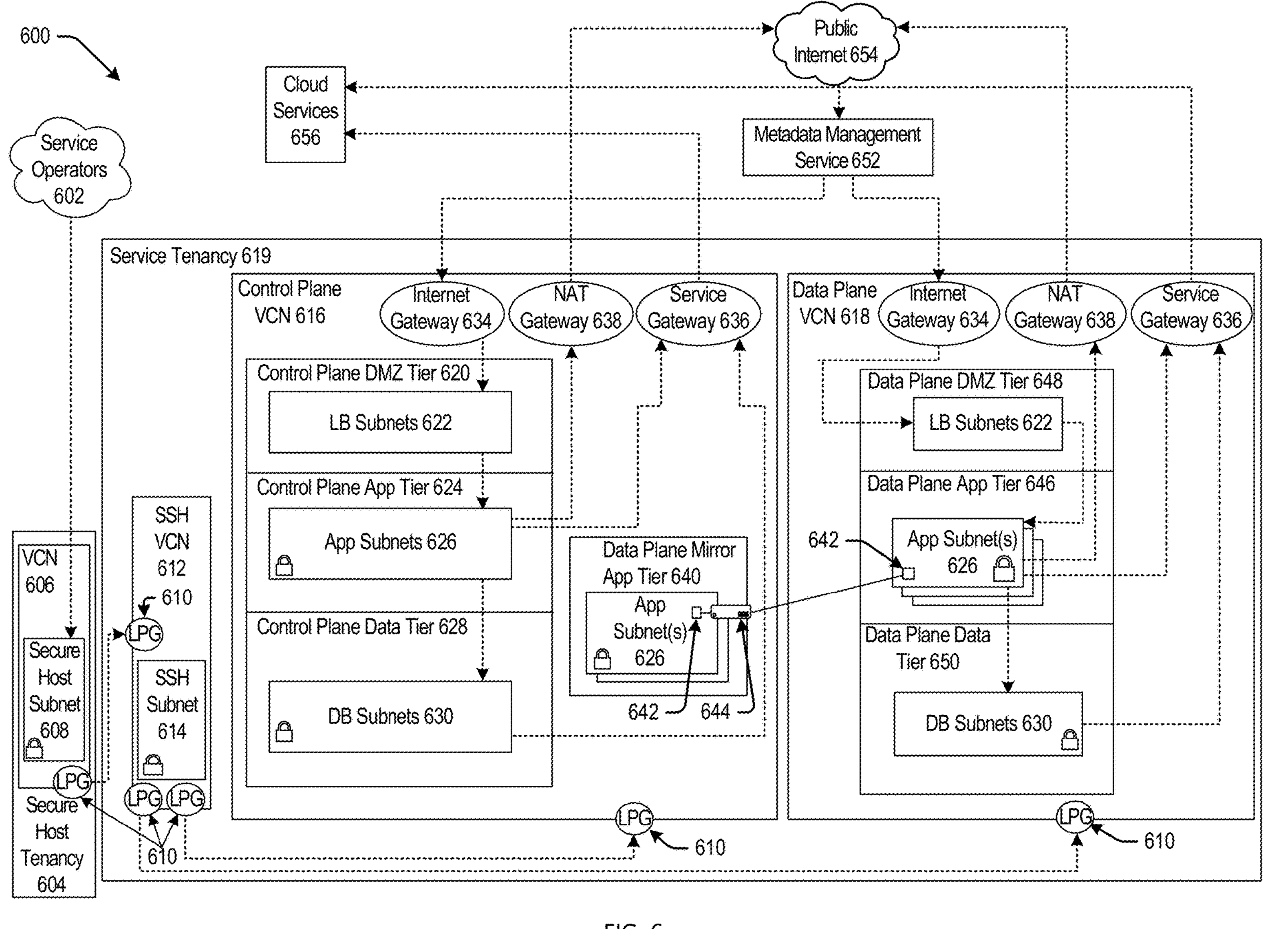
FIG. 6 is a block diagram illustrating one pattern for implementing a cloud infrastructure as a service system, according to at least one embodiment.
Figure 7:
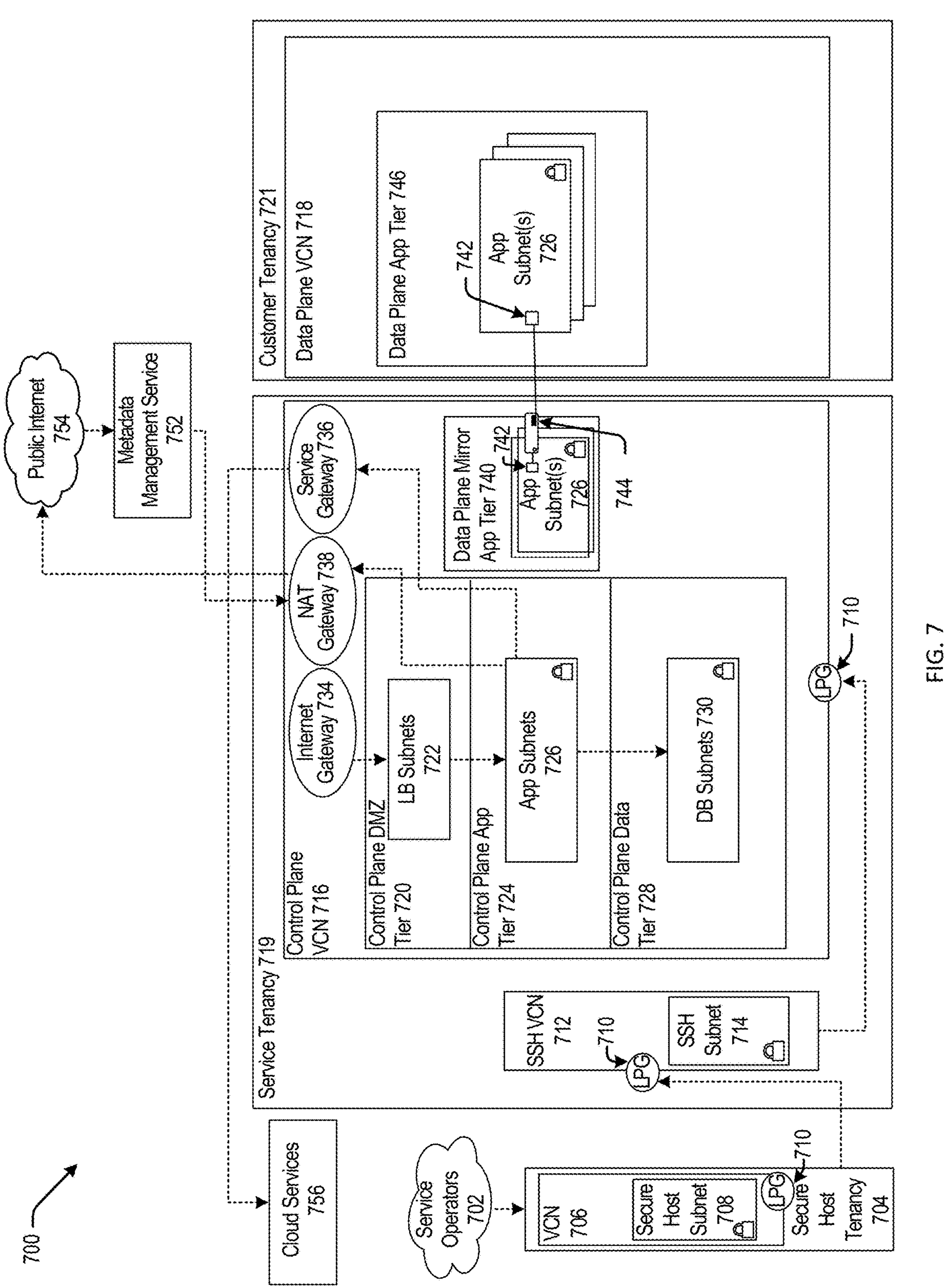
FIG. 7 is a block diagram illustrating another pattern for implementing a cloud infrastructure as a service system, according to at least one embodiment.
Figure 8:
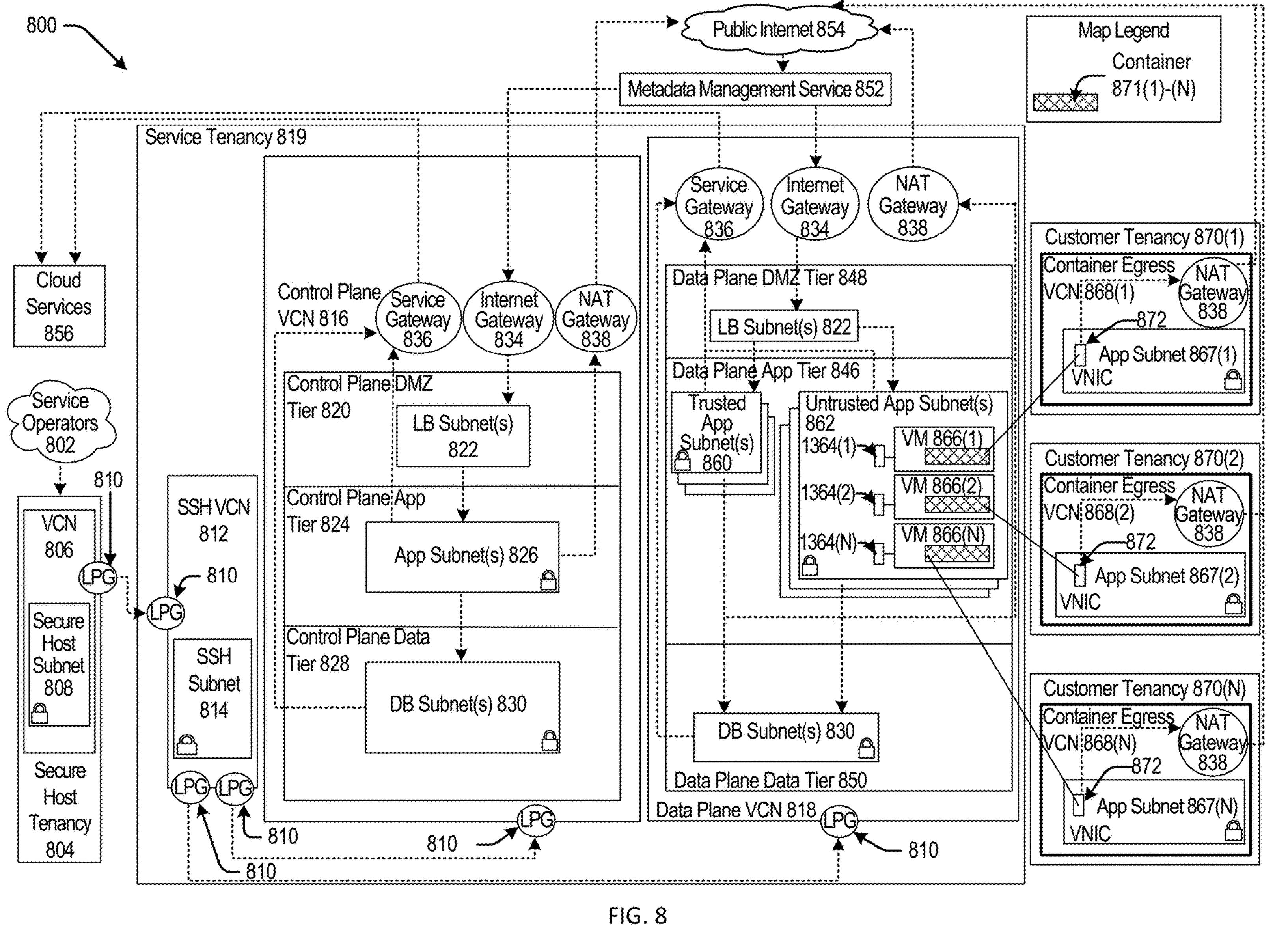
FIG. 8 is a block diagram illustrating another pattern for implementing a cloud infrastructure as a service system, according to at least one embodiment.
Figure 9:
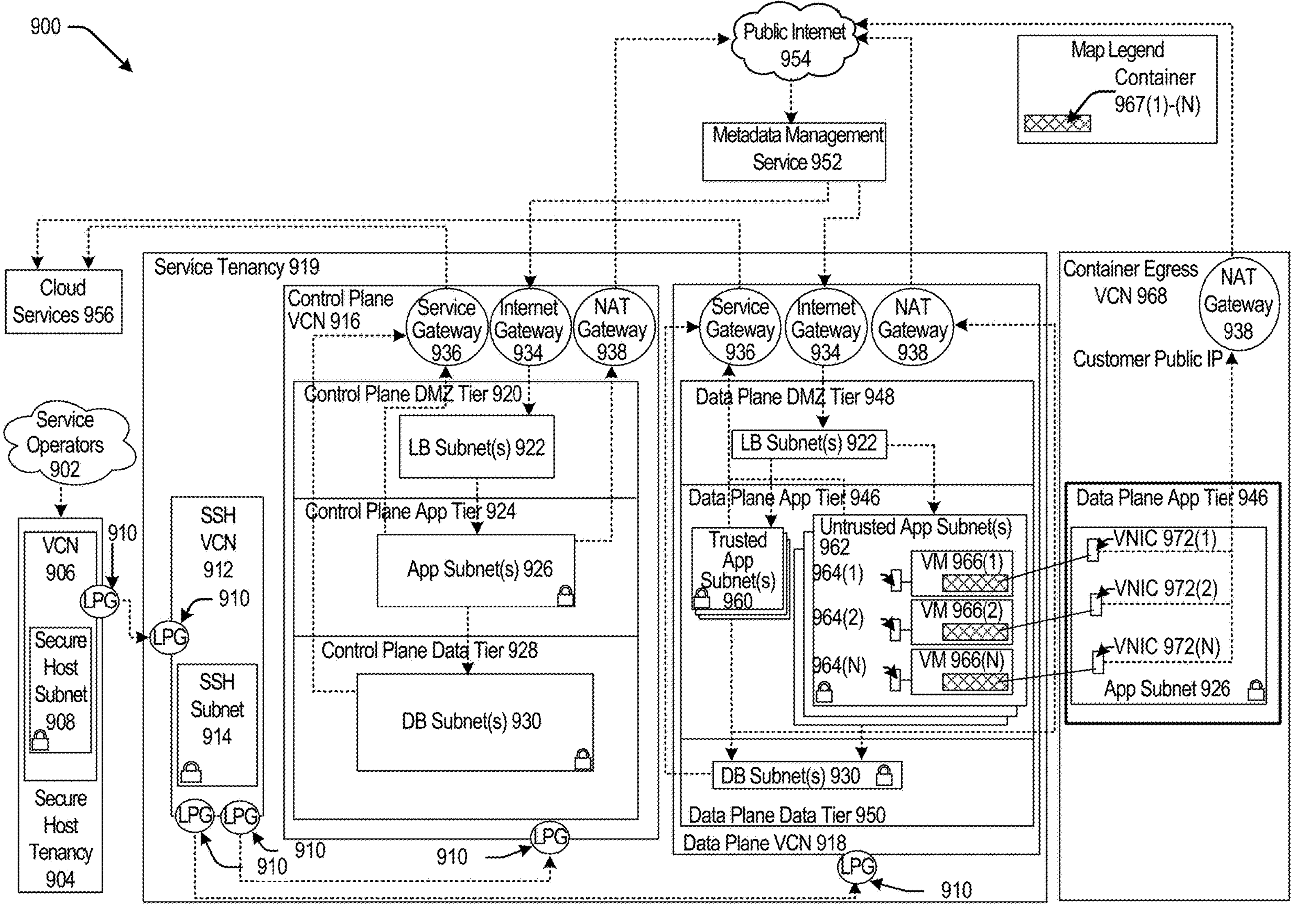
FIG. 9 is a block diagram illustrating another pattern for implementing a cloud infrastructure as a service system, according to at least one embodiment.

The present disclosure describes techniques for transferring workloads and/or other data (which is referred to simply as "workloads" throughout) between classified regions of an infrastructure (such as a cloud infrastructure service, e.g., the cloud infrastructure of FIG. 6, the cloud infrastructure of FIG. 7, the cloud infrastructure of FIG. 8, and/or the cloud infrastructure of FIG. 9) provided by a cloud servicer provider (CSP). More particularly, to transfer workloads between classified regions (which may be referred to as security regions), devices at the classified regions may verify that the workloads to be transferred between the classified regions have signatures corresponding to the proper authorizers to provide authorization of the transfer of the workloads between the classified regions. Based on the devices verifying that the workloads has the proper signatures, the devices may facilitate the transfer of the workloads between the classified regions.

A CSP may provide a variety of services to customers on demand using different systems and infrastructure services (referred to herein as cloud infrastructure service(s)). In certain embodiments, a CSP may provide services under an Infrastructure-as-a-Service (IaaS) model, wherein the CSP provides infrastructure services that can be used by customer to build their own networks and deploy customer resources. The CSP-provided infrastructure may include interconnected high-performance computer resources including various host machines (also referred to as hosts), memory resources, and network resources that form a physical network, which is referred to as a substrate network or an underlay network. The CSP-provided infrastructure may be spread across one or more data centers that may be geographically spread across one or more regions.

The physical network of the CSP, which may include the various host machines, memory resources, and/or network resources, may provide the underlying basis for creating one or more virtual or overlay networks on top of the physical network. These virtual or overlay networks (also referred to as software-based or software-defined networks) may be implemented using software virtualization technologies to create layers of network abstraction that can be run on top of the physical network. Overlay networks can take on many forms. Overlay networks may use Layer-3 IP addressing with endpoints designated by their virtual IP addresses. This method of overlay networking is often referred to as virtual Layer 3 networking.

When a customer subscribes to or registers for an IaaS service provided by a CSP, a tenancy may be created for that customer, where the tenancy is a secure and isolated partition within the CSP's infrastructure service where the customer can create, organize, and administer their cloud resources. For example, a customer can use resources provided by the CSP to build one or multiple customizable and private virtual network(s) referred to as virtual cloud networks (VCNs) within the customer's tenancy. One or more customer resources, such as compute instances (e.g., virtual machines, bare metal instances, etc.) can be deployed on these customer VCNs.

In some instances, a customer may establish customer VCNs that have one or more classified regions. The classified regions may provide high level of security for workloads and/or other data that may be classified as secret or top secret. Each of the classified regions may have at least one corresponding device that limits the transfer of the workloads and/or other data with the classified region. To provide for transfer of the workloads and/or other data with a classified region in accordance with embodiments disclosed herein, a device corresponding to a classified region may verify that the workloads and/or other data to be transferred have at least one signature corresponding to an authorizer associated with the originating classified region and at least one signature corresponding to an authorizer associated with the destination classified region prior to allowing transfer of the workloads and/or other data.

Figure 1:
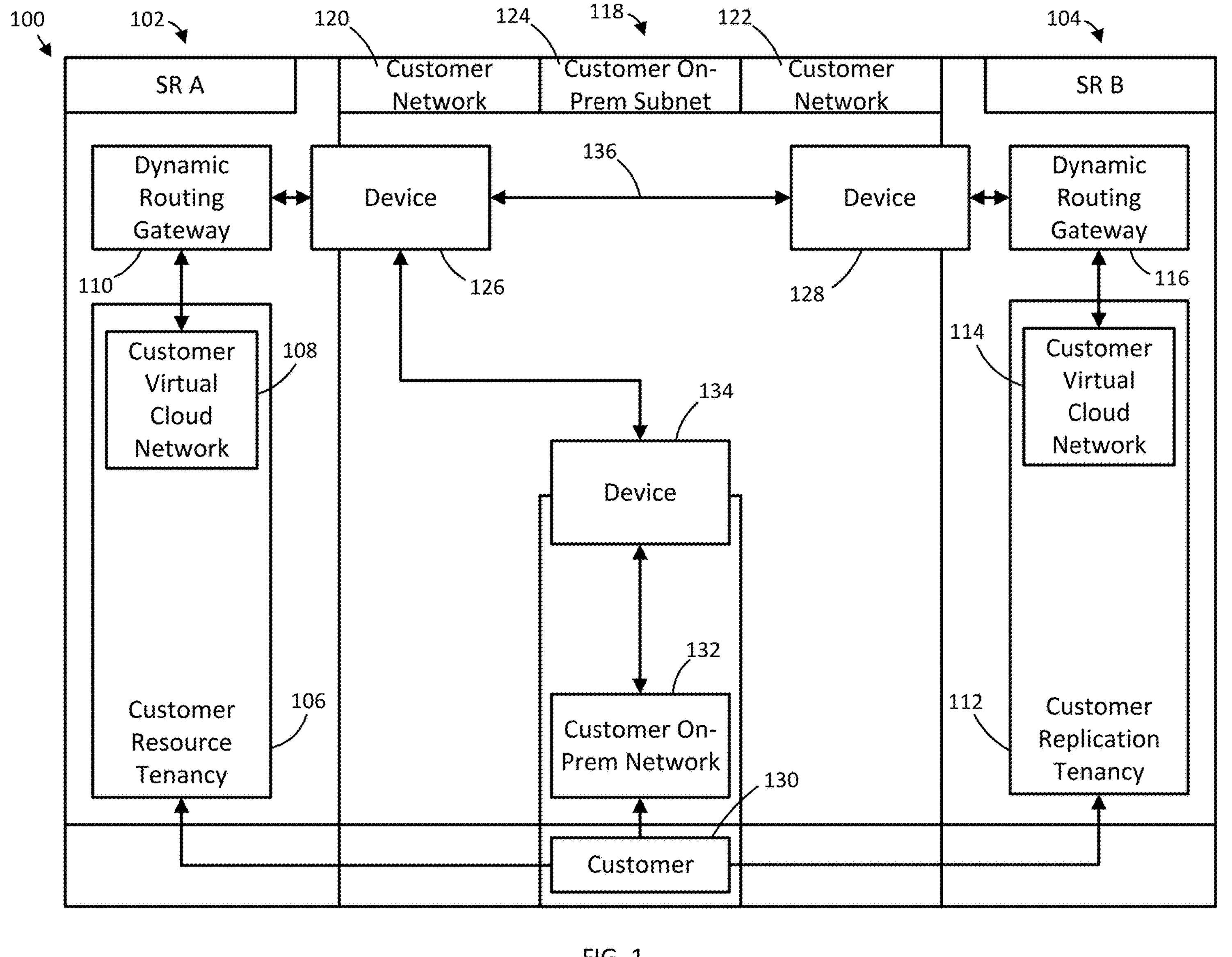
FIG. 1 illustrates an example system arrangement in accordance with some embodiments.

FIG. 1 illustrates an example system arrangement 100 in accordance with some embodiments. In particular, the system arrangement 100 illustrates a portion of an infrastructure service and customer equipment that may implement one or more of the approaches for transferring workloads and/or other data between security regions (which may also be referred to as classified regions) described throughout the disclosure. In some embodiments, the infrastructure service may include one or more of the features of the cloud infrastructure of FIG. 6, the cloud infrastructure of FIG. 7, the cloud infrastructure of FIG. 8, and/or the cloud infrastructure of FIG. 9. The infrastructure service may comprise a computing system. In some embodiments, the infrastructure service may comprise a cloud computing system. The infrastructure service may include hardware and/or software of the infrastructure that can provide services for a client. In some embodiments, the customer equipment may include one or more customer elements (such as customer computer systems) that may be implemented in a customer VCN.

The system arrangement 100 may include one or more security regions. For example, the system arrangement 100 includes a first security region 102 and a second security region 104 in the illustrated embodiment. For brevity and clarity, the following description will refer to the first security region 102 and the second security region 104, although it should be understood that other security regions in other embodiments of the system arrangement 100 may include one or more of the features of the first security region 102 and/or the second security region 104.

Each of the first security region 102 and the second security region 104 may correspond to different geographic areas. For example, the first security region 102 may correspond to a first geographic area and the second security region 104 may correspond to a second geographic area, where the second geographic area is different from the first geographic area. In some embodiments, geographic areas may be defined by continents, geographic regions, countries, states, buildings (which may be represented by an address), portions of buildings (such as rooms), computing systems (such as servers corresponding to the regions), or portions of computing systems (such as storage locations corresponding to the region). Further, the first security region 102 may be located in a first realm and the second security region 104 may be located in a second realm different than the first realm in some embodiments. Each realm may include one or more regions.

Each of the first security region 102 and the second security region 104 may provide higher levels of security than non-security regions. For example, the security regions may not be connected to public networks, such as the Internet. In some embodiments, the security regions may have an air gap, where each of the security regions may be physically isolated from public networks. In contrast, the security regions may be connected to private networks, which can prevent public access to the private networks thereby preventing hacking or other unauthorized activities from public entities. Further, the workloads and/or data stored within the secured encrypted in accordance with security standards, such as commercial national security algorithm (CNSA) standards.

The first security region 102 may include a customer resource tenancy 106. The customer resource tenancy 106 may comprise a secure and isolated partition of the infrastructure service. A customer may be able to create, organize, and administer cloud resources within the customer resource tenancy 106. For example, the customer resource tenancy 106 may store workloads when transferred from a customer subnet into the realm. Accordingly, the customer resource tenancy 106 may comprise a secure and isolated partition of the infrastructure service where workloads are stored when provided by the customer.

The customer resource tenancy 106 may include a customer virtual cloud network 108. The customer virtual cloud network 108 may comprise a virtual, private network that can be setup in one or more data centers. The customer virtual cloud network 108 may have firewall rules and/or communication gateways that can protect the resources within the customer resource tenancy 106 and facilitate transfer of the resources.

The first security region 102 may further include a dynamic routing gateway 110. The dynamic routing gateway 110 may be coupled to the customer virtual cloud network 108 and may facilitate transfer of workloads and/or resources with the customer resource tenancy 106. For example, the dynamic routing gateway 110 may comprise a virtual router that can be utilized for attaching the customer virtual cloud network 108 to one or more other networks or network elements.

The second security region 104 may include a customer replication tenancy 112. The customer replication tenancy 112 may comprise a secure and isolated partition of the infrastructure service. The secure and isolated partition corresponding to the customer replication tenancy 112 may be separate from the secure and isolated partition corresponding to the customer resource tenancy 106. A customer may be able to create, organize, and administer cloud resources within the customer replication tenancy 112. For example, the customer replication tenancy 112 may store workloads for load balancing, disaster recovery, and high availability needs. Accordingly, the customer replication tenancy 112 may comprise a secure and isolated partition of the infrastructure service where workloads are stored for load balancing, disaster recovery, and high availability needs.

The customer replication tenancy 112 may include a customer virtual cloud network 114. The customer virtual cloud network 114 may comprise a virtual, private network that can be setup in one or more data centers. The customer virtual cloud network 114 may have firewall rules and/or communication gateways that can protect the resources within the customer replication tenancy 112 and facilitate transfer of the resources.

The second security region 104 may further include a dynamic routing gateway 116. The dynamic routing gateway 116 may be coupled to the customer virtual cloud network 114 and may facilitate transfer of workloads and/or resources with the customer replication tenancy 112. For example, the dynamic routing gateway 116 may comprise a virtual router that can be utilized for attaching the customer virtual cloud network 114 to one or more other networks or network elements.

The system arrangement 100 may further include customer equipment 118. The customer equipment 118 may comprise computer equipment maintained and/or operated by the customer. The customer equipment 118 may include a customer network. In the illustrated embodiment, the customer network is shown as first customer network 120 and second customer network 122, where the first customer network 120 and the second customer network 122. The customer network may comprise a private network. For example, the customer network may utilize private address of IP addresses, where internet protocol version 4 (IPv4) and/or internet protocol version 6 (IPv6) specifications may be supported. The customer network may be separate from public networks.

The first customer network 120 may correspond to the first security region 102. The first customer network 120 may include a first device 126. The first device 126 may be located at the first security region 102 and may manage transmissions of workloads and/or other data with the first security region 102. In particular, the first device 126 may limit the transmissions of workloads and/or other data with the first security region 102 to authorized transmissions. In some embodiments, the first device 126 may comprise a first cryptographic appliance. The first cryptographic appliance may comprise computer hardware that can verify authorization for transfer of the workloads and/or other data with the first security region 102. For example, the first cryptographic appliance may verify that the workloads and/or other data have one or more signatures (or other credentials) that indicate that the workloads and/or other data are authorized for transfer. The first cryptographic appliance may also encrypt or decrypt workloads and/or other data being transferred with the first security region 102. In some embodiments, the first cryptographic appliance may be associated with the customer and may allow transfer of the workloads and/or other data only with other cryptographic appliances associated with the customer.

The second customer network 122 may correspond to the second security region 104. The second customer network 122 may include a second device 128. The second device 128 may be located at the second security region 104 and may manage transmissions of workloads and/or other data with the second security region 104. In particular, the second device 128 may limit the transmissions of workloads and/or other data with the second security region 104 to authorized transmissions. In some embodiments, the second device 128 may comprise a second cryptographic appliance. The second cryptographic appliance may comprise computer hardware that can verify authorization for transfer of the workloads and/or other data with the second security region 104. For example, the second cryptographic appliance may verify that the workloads and/or other data have one or more signatures (or other credentials) that indicate that the workloads and/or other data are authorized for transfer. The second cryptographic appliance may also encrypt or decrypt workloads and/or other data being transferred with the second security region 104. In some embodiments, the second cryptographic appliance may be associated with the customer and may allow transfer of the workloads and/or other data only with other cryptographic appliances associated with the customer. In the illustrated embodiment, the second device 128 may be coupled to the first device 126, which may allow for transfer of workloads and/or other data between the first security region 102 and the second security region 104.

The customer equipment 118 may further include a customer on-premise subnet 124. The customer on-premise subnet 124 may comprise a subnet with elements located on a premise of the customer. The customer on-premise subnet 124 may include a customer device 130, a customer on-premise network 132, and/or a third device 134. The customer device 130 may comprise a computer device that has a user interface with which the customer may interact to perform operations with the customer on-premise subnet 124. The customer device 130 may be coupled with the customer on-premise network 132. The customer on-premise network 132 may be formed by one or more devices of the customer. The customer on-premise network 132 may comprise a private network. The customer device 130 may further be coupled to the customer resource tenancy 106 and/or the customer replication tenancy 112. The customer device 130 may communicate with the customer resource tenancy 106 and/or the customer replication tenancy 112, and may request the customer resource tenancy 106 and/or the customer replication tenancy 112 to perform one or more operations.

The customer on-premise subnet 124 may further include a third device 134. The third device 134 may be coupled to the customer on-premise network 132 and may manage transmissions of workloads and/or other data with the customer on-premise network 132. In particular, the third device 134 may limit the transmissions of workloads and/or other data with the customer on-premise network 132 to authorized transmissions. In some embodiments, the third device 134 may comprise a third cryptographic appliance. The third cryptographic appliance may comprise computer hardware that can verify authorization for transfer of the workloads and/or other data with the customer on-premise network 132. For example, the third cryptographic appliance may verify that the workloads and/or other data have one or more signatures (or other credentials) that indicate that the workloads and/or other data are authorized for transfer. The third cryptographic appliance may also encrypt or decrypt workloads and/or other data being transferred with the customer on-premise network 132. In some embodiments, the third cryptographic appliance may be associated with the customer and may allow transfer of workloads and/or other data only with other cryptographic appliances associated with the customer. In the illustrated embodiment, the third device 134 may be coupled to the first device 126, which may allow for transfer of workloads and/or other data between the customer on-premise network 132 and the first security region. In other embodiments, the third device 134 may be coupled to the second device 128, or the first device 126 and the second device 128.

The customer may utilize the customer device 130 to store one or more workloads and/or other data in the first security region 102. For example, the one or more workloads and/or other data may be provided to the first security region 102 via the third device 134 and the first device 126. The third device 134 may encrypt the one or more workloads and/or other data from the customer device 130 and provide the workloads and/or other data to the first device 126. The first device 126 may decrypt the workloads and/or other data, and may provide the workloads and/or other data to the dynamic routing gateway 110 for storage in the customer resource tenancy 106.

The customer may wish to transfer one or more of the workloads and/or other data from the first security region 102 to the second security region 104 or vice versa. However, the first security region 102 and the second security region 104 may not have trust with each other for transfer of workloads and/or other data. However, the customer may implement approaches described herein for providing trust between the first security region 102 and the second security region 104 for transfer of workloads and/or other data. For brevity, the following description is directed to transfer of a workload from the first security region 102 to the second security region 104. It should be understood that the approaches described may be applied for transfers of one or more workloads and/or other data, and for transfers from the second security region 104 to the first security region 102.

To provide trust between the first security region 102 and the second security region 104, a first authorizer associated with the first security region 102 and a second authorizer associated with the second security region 104 may provide authorization for the transfer of a workload. The first device 126 and the second device 128 may be configured to verify that the first authorizer and the second authorizer have provided authorization for transfer of the workload prior to the workload being transferred. For example, the customer may utilize the customer device 130 to configure the first device 126 and the second device 128 to verify that the workload, the customer replication tenancy 112, and/or an object store within the customer replication tenancy 112 has been signed with at least one signature corresponding to the first authorizer and at least one signature corresponding to the second authorizer. The signature corresponding to the first authorizer may be associated with the first security region 102 and the signature corresponding to the second authorizer may be associated with the second security region 104. In the illustrated embodiments, the customer device 130 may transmit requests via the customer on-premise network 132 and the third device 134 to the first device 126 and the second device 128 to be configured to verify the signatures of the workload. In some embodiments, the requests may include an indication of the signatures for verification, an indication of a source region (which is the first security region 102 in the described instance), an indication of a destination region (which is the second security region in the described instance), an indication of the first authorizer associated with the first security region 102, an indication of the second authorizer associated with the second security region 104, an indication of users authorized to access the workload, or some combination thereof. In some embodiments, the requests may include a policy statement that indicates the signatures for verification, the source region for which the signatures provide authorization, the destination region for which the signatures provide authorization, or some combination thereof. In some embodiments, the signatures may be provided by the first authorizer and the second authorizer, or by other individuals associated with the first security region 102 and the second security region 104. The customer or the customer device 130 may obtain the signatures from the first authorizer, the second authorizer, and/or the individuals via phone communication, electronic mail communication, electronic communication, or another communication.

The customer may request transfer of the workload from the first security region 102 to the second security region 104 via the customer device 130. Based on the request, the customer device 130 may determine whether authorization has been received from the first authorizer and the second authorizer for the transfer of the workload. If the customer device 130 determines that authorization for the transfer of the workload has been received from the first authorizer and the second authorizer, the customer device 130 may sign the workload, the customer replication tenancy 112, and/or the object store within the customer replication tenancy 112. If the customer device 130 determines that authorization has not been received for the transfer of the workload, the customer device 130 and/or the customer may communicate (such as via phone communication, electronic mail, electronic communication, or another communication) with the first authorizer and the second authorizer to determine whether the first authorizer and the second authorizer will grant authorization for the transfer of the workload. The customer device 130 and/or the customer may determine based on responses from the first authorizer and the second authorizer provide authorization. In some instances, responses providing authorization from the first authorizer and the second authorizer may include the signature corresponding to the first authorizer and the second authorizer. If the first authorizer and the second authorizer provide authorization, the customer device 130 may sign, or the customer may cause the customer device 130 to sign, the workload, the customer replication tenancy, and/or the object store with the signatures.

Based on the request to transfer the workload, the first device 126 and the second device 128 may verify that the workload, the customer replication tenancy 112, and/or the object store have the signatures corresponding to the first authorizer and the second authorizer when transferring the workload. For example, the customer resource tenancy 106 may provide the workload to the dynamic routing gateway 110, which in turn provides the workload to the first device 126. Upon receiving the workload, the first device 126 may verify that the workload has been signed with the signatures corresponding to the first authorizer and the second authorizer. If first device 126 determines that the workload does not have the signatures, the first device 126 may prevent the workload from being transferred. If the first device 126 determines that the workload has the signatures, the first device 126 may encrypt the workload. The first device 126 may transmit the encrypted workload via a connection 136 to the second device 128. The connection 136 may be a private network connection provided by a private network of the customer. Upon receiving the encrypted workload, the second device 128 may verify that the encrypted workload has the signatures corresponding to the first authorizer and the second authorizer. In some embodiments, the second device 128 may further verify that the customer replication tenancy 112 and/or the object store has been signed with the signatures corresponding to the first authorizer and the second authorizer. In some of these embodiments, the second device 128 may compare the signatures of the workload with the signatures of the customer replication tenancy 112 and/or object store to determine whether the signatures match. If the second device 128 determines that the signatures are properly verified (either through the workload having the signatures, and/or the signatures of the workload matching the signatures of the customer replication tenancy and/or the object store), the second device 128 may decrypt the encrypted workload. The second device 128 may provide the decrypted workload to the dynamic routing gateway 116, which in turn provides the workload to the customer replication tenancy 112 for storage.

The approach described above may allow the workload to be transferred from the first security region 102 to the second security region 104 without having to manually connecting and disconnecting a computer to transfer the workload. Accordingly, the workload may be transferred directly from the first security region 102 to the second security region 104. Further, the encryption of the workload when being transferred and utilizing the private network for the transfer can provide for secure transfer of workload. The approaches described herein can provide efficient and secure transfers of workloads.

Figure 2:
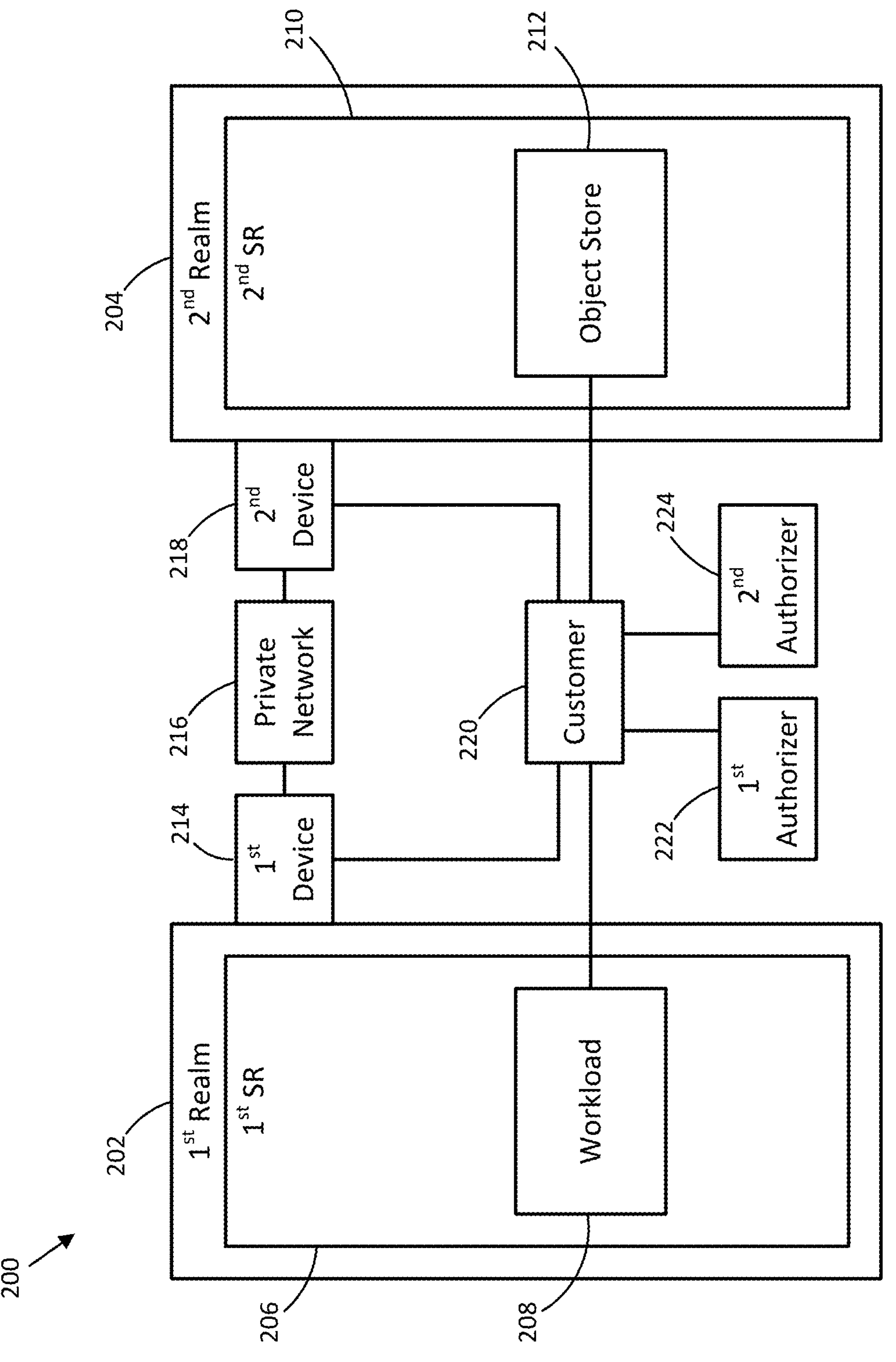
FIG. 2 illustrates another example system arrangement in accordance with some embodiments.

FIG. 2 illustrates another example system arrangement 200 in accordance with some embodiments. In particular, the system arrangement 200 illustrates a portion of an infrastructure service and customer equipment that may implement one or more of the approaches for transferring workloads and/or other data between security regions (which may also be referred to as classified regions) described throughout the disclosure. In some embodiments, the infrastructure service may include one or more of the features of the cloud infrastructure of FIG. 6, the cloud infrastructure of FIG. 7, the cloud infrastructure of FIG. 8, and/or the cloud infrastructure of FIG. 9. The infrastructure service may comprise a computing system. In some embodiments, the infrastructure service may comprise a cloud computing system. The infrastructure service may include hardware and/or software of the infrastructure that can provide services for a client. In some embodiments, the customer equipment may include one or more customer elements (such as customer computer systems) that may be implemented in a customer VCN.

The system arrangement 200 may include a first realm 202 and a second realm 204. The first realm 202 and the second realm 204 may each be highly restricted application environments within the infrastructure service that prevent access to application data while allowing authorized administrative activities. The first realm 202 and the second realm 204 may be independent of each other, where operations and/or data within the first realm 202 does not depend on operations and/or data within the second realm 204 and vice versa. The first realm 202 may be isolated from public networks, such as the Internet. The first realm 202 may be part of an air gapped network, where the first realm 202 may be physically isolated from public networks. Further, the second realm 204 may be part of an air gapped network, where the second realm 204 may be physically isolated from public networks. The first realm 202 and the second realm 204 may be part of a same air gapped network or may be part of separate air gapped networks.

The first realm 202 may include a first security region 206. The first security region 206 may include one or more of the features of the first security region 102 (FIG. 1). The first security region 206 may store one or more workloads, such as workload 208. Each workload may comprise a set of data to be operated upon. Each workload may have an identifier, which can be utilized to identify the workload. The first security region 206 may be associated with a customer, where the workloads stored within the first security region 206 may be associated with the customer.

The second realm 204 may include a second security region 210. The second security region 210 may include one or more of the features of the second security region 104 (FIG. 1). The second security region 210 may be associated with the customer. In some instances, the customer may want to transfer one or more workloads from the first security region 206 to the second security region 210. For example, the customer may want to transfer the workloads from the first security region 206 to object stores, such as object store 212, within the second security region 210. However, due to the security of the first realm 202 and the second realm 204 (including each of the first realm 202 and the second realm 204 being part of the air gapped networks), the first realm 202 and the second realm 204 may not allow direct transfer of workloads via legacy approaches.

The system arrangement 200 may include a first device 214, a private network connection 216, and a second device 218 that provide a connection between the first realm 202 and the second realm 204. In particular, the first device 214, the private network connection 216, and the second device 218 may form a private network connection between the first realm 202 and the second realm. The private network connection may facilitate transfers of workloads between the first realm 202 and the second realm 204.

The first device 214 may include one or more of the features of the first device 126 (FIG. 1), including being a cryptographic appliance in some embodiments. The first device 214 may be located at the first realm 202 and/or the first security region 206. The first device 214 may limit transmissions with the first realm 202 and/or the first security region 206 to authorized transmissions. For example, the first device 214 may verify that transmissions between the first realm 202 and/or the first security region 206 and other devices have authorization before allowing the transmissions. For transmissions that are authorized, the first device 214 may encrypt and/or decrypt the transfers.

The second device 218 may include one or more of the features of the second device 128 (FIG. 1), including being a cryptographic appliance in some embodiments. The second device 218 may be located at the second realm 204 and/or the second security region 210. The second device 218 may limit transmissions with the second realm 204 and/or the second security region 210 to authorized transmissions. For example, the second device 218 may verify that transmissions between the second realm 204 and/or the second security region 210 and other devices have authorization before allowing the transmissions. For transmissions that are authorized, the second device 218 may encrypt and/or decrypt the transfers.

The system arrangement 200 may include a customer device 220. The customer device 220 may include one or more features of the customer device 130 (FIG. 1). The customer device 220 may be coupled to the first device 214 and/or the second device 218. The customer device 220 may configure the first device 214 and/or the second device 218 for which transmissions to allow. For example, the customer device 220 may provide policy statements to the first device 214 and/or the second device 218 that define which transfers are authorized to be transferred. The policy statements may indicate one or more signatures that indicate authorization for transfer of the workloads. In some embodiments, the policy statements may further indicate realms and/or regions between which the workloads are authorized to be transferred. In some embodiments, the indication of the realms and/or regions may be associated with a corresponding signature, such as that the signature indicates that the workload is authorized for transmission among the indicated realms and/or regions.

The customer device 220 may further be coupled to the first realm 202 and/or the second realm 204. In some embodiments, a device (such as the third device 134) may be coupled at the customer device 220 between the customer device and the first realm 202 and/or the second realm 204. The customer device 220 may provide requests to the first realm 202 and/or the second realm 204 to transfer workloads between the first realm 202 and the second realm 204. For example, the customer device 220 may request a one-time transfer of workloads between the first realm 202 and the second realms 204 and/or may set up repetitive transfers for certain defined workloads. In the illustrated embodiment, the customer device 220 may request that the workload 208 be transferred from the first realm 202 to the second realm 204, such as for storage in the object store 212.

The customer device 220 may further sign, or cause to be signed, workloads and/or object stores. For example, the customer device 220 may sign, or cause to be signed, the workload 208 and/or the object store 212 in the illustrated embodiment, where the signature may indicate that the workload 208 is authorized to be transferred. The customer device 220 may sign the workload 208 and/or the object store 212 based on indications from a first authorizer 222 and a second authorizer 224 indicating that the transfer of the workload 208 is authorized. The first authorizer 222 may be associated with the first realm 202 and the second authorizer 224 may be associated with the second realm 204. In particular, the first authorizer 222 may be an individual and/or device that can provide authorization for transfers with the first realm 202 and the second authorizer 224 may be an individual and/or device that can provide authorization for transfers with the second realm 204. For example, the customer device 220, or a customer utilizing the customer device 220, may determine whether authorization for the transfer of the workload 208 had previously been received from the first authorizer 222 and the second authorizer 224. If the authorization had previously been received, the customer device 220 may sign, or may cause to be signed, the workload 208 and/or the object store 212.

If the authorization had not previously been received, the customer device 220 may request authorization from the first authorizer 222 and the second authorizer 224, or may indicate to the customer that authorization needs to be requested from the first authorizer 222 and the second authorizer 224. The request for authorization provided to the first authorizer 222 and the second authorizer 224 may include an indication of the workload 208, an indication of the source realm from which the workload 208 is to be transferred, an indication of the destination realm to which the workload 208 is to be transferred, or some combination thereof. In some instances, the request may further indicate a security level (such as being secret or top secret) of the workload 208. The first authorizer 222 and the second authorizer 224 may respond to the requests with whether the transfer of the workload is authorized. If the customer device 220 determines that both the first authorizer 222 and the second authorizer 224 indicated that the transfer is authorized, the customer device 220 may sign, or cause to be signed, the workload 208 and/or the object store 212.

The signatures applied to the workload 208 may provide information for which the transfer of the workload 208 is authorized. For example, the signatures may indicate the source realm from which the workload 208 is authorized to be transferred from and/or the destination realm to which the workload 208 is authorized to be transferred to. In the illustrated instance, the signatures may indicate that the workload 208 is authorized to be transferred from the first realm 202 to the second realm 204. In some embodiments, the signatures may also indicate whom provided authorization for the signatures to be applied to the workload 208 and/or the object store 212, and/or users within the second realm 204 that will be authorized to access once transferred to the second security region 210. For example, the signatures may indicate that the first authorizer 222 and the second authorizer 224 provided authorization for the transfer of the workload 208.

Based on the request from the customer device 220 to transfer the workload 208, the first security region 206 may provide the workload 208 to the first device 214 for transfer to the second security region 210. The first device 214 may verify that the workload 208 has proper signatures indicating that the workload 208 is authorized to be transferred to the second security region 210. In particular, the first device 214 may utilize a policy statement with which the first device 214 has been configured to determine whether the workload 208 has proper signatures indicating that the workload is authorized for transfer from the first security region 206 to the second security region 210. For example, the policy statement may cause the first device 214 to verify that the signatures indicate that the first authorizer 222 and the second authorizer 224 have indicated that the workload 208 is authorized for transfer. In some embodiments, the policy statement may further cause the first device 214 to verify that the workload 208 is authorized to be transferred from the first realm 202, that the workload 208 is authorized to be transferred to the second realm 204, or some combination thereof based on signatures of the workload 208. If the first device 214 determines that the workload 208 does not have the proper signatures for authorization, the first device 214 may prevent the workload 208 from being transmitted to the second realm 204. If the first device 214 determines that the workload 208 has the proper signatures for authorization, the first device 214 may encrypt the workload and may transmit the encrypted workload 208 via the private network connection 216 to the second device 218.

Based on the second device 218 receiving the encrypted workload 208, the second device 218 may verify that the encrypted workload 208 and/or the object store 212 have proper signatures for authorization of transfer of the workload 208. For example, the second device 218 may utilize a policy statement with which the second device 218 has been configured to determine whether the encrypted workload 208 and/or the object store 212 has proper signatures indicating that the workload is authorized for transfer from the first security region 206 to the second security region 210. For example, the policy statement may cause the second device 218 to verify that the signatures of the encrypted workload 208 and/or the object store 212 indicate that the first authorizer 222 and the second authorizer 224 have authorized transfer of the workload 208. In some embodiments, the policy statement may further cause the first device 214 to verify that the workload 208 is authorized to be transferred from the first realm 202, that the workload 208 is authorized to be transferred to the second realm 204, or some combination thereof based on signatures of the encrypted workload 208 and/or the object store 212. Further, the policy statement may cause the second device 218 to compare signatures of the encrypted workload 208 and signatures of the object store 212 match to verify that the workload 208 is authorized for transfer from the first security region 206 to the second security region 210 If the second device 218 determines that the encrypted workload 208 does not have the proper signatures for authorization, the second device 218 may prevent the encrypted workload 208 from being provided to the second realm 204. If the second device 218 determines that the encrypted workload 208 has the proper signatures for authorization, the second device 218 may decrypt the workload and provide the decrypted workload to the second security region for storage in the object store 212.

Figure 3:
FIG. 3 illustrates an example procedure for providing a workload from a first security region of a cloud service provider (CSP) to a second security region of the CSP in accordance with some embodiments.
Figure 3:
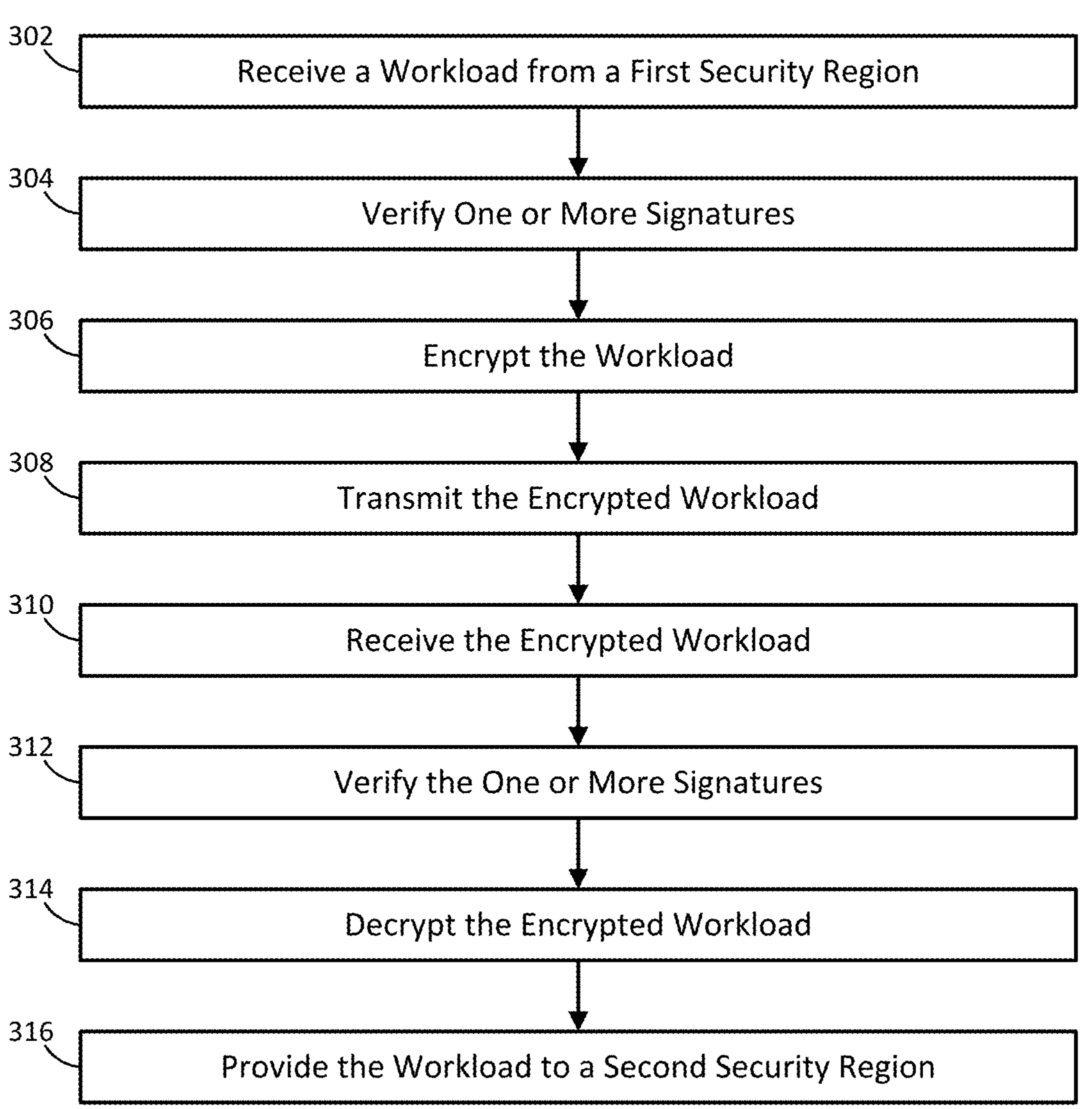

FIG. 3 illustrates an example procedure 300 for providing a workload from a first security region of a CSP to a second security region of the CSP in accordance with some embodiments. This process (e.g., procedure 300) is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process. The procedure 300 may be performed by customer equipment (such as the customer equipment 118 (FIG. 1)) or some portion thereof. For example, the procedure 300 may be performed by one or more devices (such as the first device 126 (FIG. 1), the second device 128 (FIG. 2), the first device 214 (FIG. 2), and/or the second device 218 (FIG. 2)).

In 302, the customer equipment may receive a workload (such as the workload 208 (FIG. 2)) from a first security region (such as the first security region 102 (FIG. 1) and/or the first security region 206 (FIG. 2)). In particular, a device (such as the first device 126 and/or the first device 214) of the customer equipment may receive the workload from the first security region. The device may be part of a private network. Further, the device may be located at the first security region. For example, the device may be connected at a connection of the first security region that can be used for transfers of workloads with the first security region. The first security region may be located within a first realm (such as the first realm 202 (FIG. 2)). The first security region may further be part of a first air gapped network.

In 304, the customer equipment may verify one or more signatures. In particular, the device may verify one or more signatures of the workload. For example, the workload may be signed with one or more signatures. The one or more signatures may include at least one signature associated with the first security region and at least one signature associated with the second security region. The device may verify that the one or more signatures authorize transfer of the workload from the first security region to the second security region.

In 306, the customer equipment may encrypt the workload. In particular, the device may encrypt the workload based at least in part on the one or more signatures of the workload being verified.

In 308, the customer equipment may transmit the encrypted workload. In particular, the device may transmit the encrypted workload to the second security region. In some embodiments, transmitting the encrypted workload may include transmitting the encrypted workload via a private network connection to the second security region. The second security region may be part of a second air gapped network in some embodiments. In these embodiments, the device may transmit the encrypted workload from the first air gapped network to the second air gapped network. Further, the second security region may be located in a second realm (such as the second realm 204 (FIG. 2)) in some embodiments. Transmitting the encrypted workload may include transmitting the encrypted workload to a second device (such as the second device 128 and/or the second device 218) over a private network. The second device may be located at the second security region. The second device may be part of a private network, which may be the same private network that includes the device.

In 310, the customer equipment may receive the encrypted workload. In particular, the second device of the customer equipment may receive the encrypted workload transmitted by the device. In some embodiments, 310 may be omitted.

In 312, the customer equipment may verify the one or more signatures. In particular, the second device may verify the one or more signatures of the workload. The second device may verify that the one or more signatures authorize transfer of the workload from the first security region to the second security region. In some embodiments, 312 may be omitted.

In 314, the customer equipment may decrypt the encrypted workload. In particular, the second device may decrypt the encrypted workload based at least in part on the one or more signatures being verified by the second device. In some embodiments, 314 may be omitted.

In 316, the customer equipment may provide the workload to the second security region. In particular, the second device may provide the workload to the second security region. The second device may provide the workload to the second security region for storage within the second security region. In some embodiments, 316 may be omitted.

Figure 4:
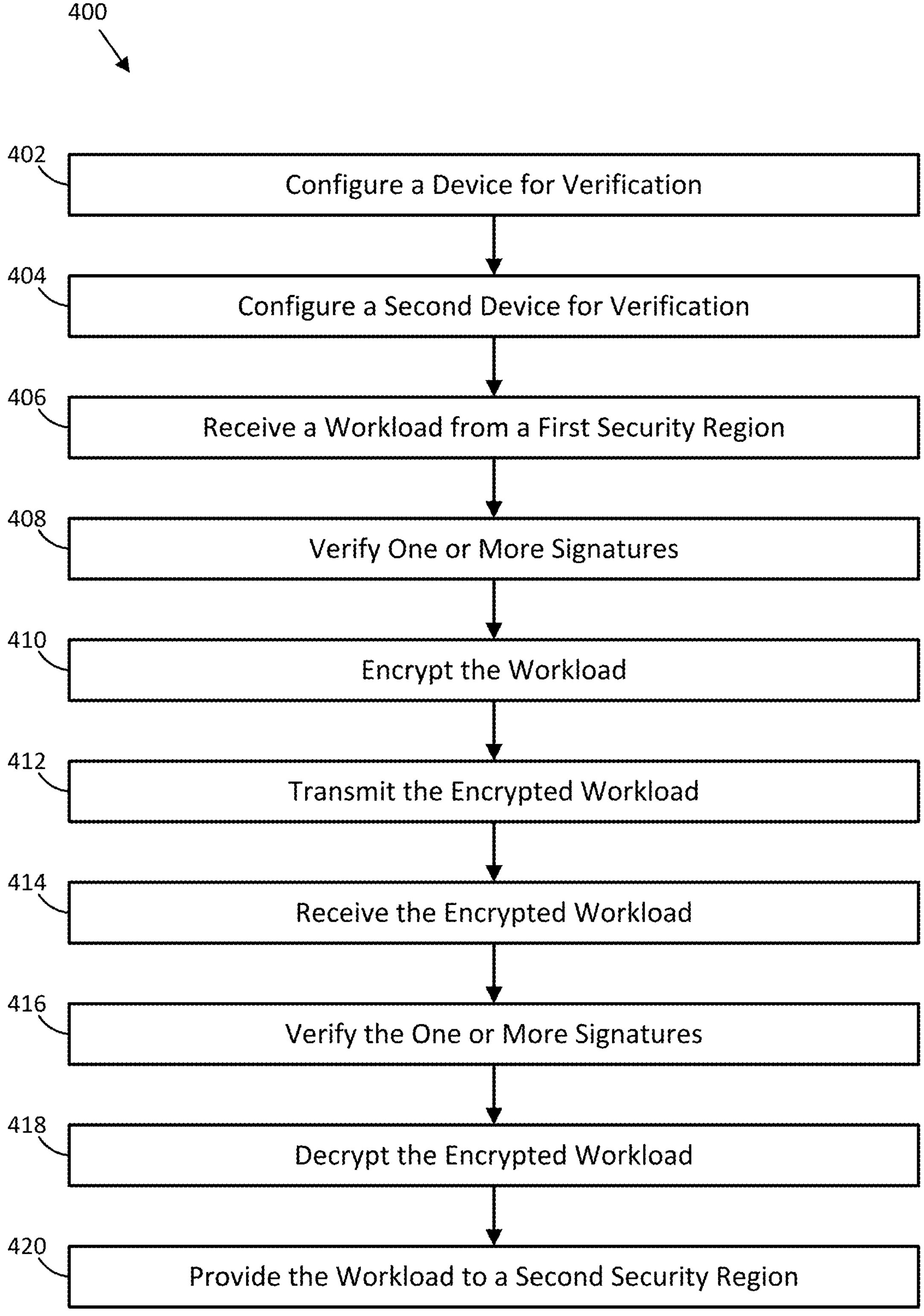
FIG. 4 illustrates another example procedure for providing a workload from a first security region of a CSP to a second security region of the CSP in accordance with some embodiments.

FIG. 4 illustrates another example procedure 400 for providing a workload from a first security region of a CSP to a second security region of the CSP in accordance with some embodiments. This process (e.g., procedure 400) is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process. The procedure 400 may be performed by a network (such as the customer equipment 118 (FIG. 1)) or some portion thereof. For example, the procedure 400 may be performed by one or more devices (such as the first device 126 (FIG. 1), the second device 128 (FIG. 2), the first device 214 (FIG. 2), and/or the second device 218 (FIG. 2)).

In 402, the network may configure a device (such as the first device 126 and/or the first device 214) for verification. In particular, the network may configure the device with one or more signatures for verification of one or more signatures of the workload. For example, the device may be configured to verify, based on one or more signatures, that workloads being transferred to or from the first security region (such as the first security region 102 (FIG. 1) and/or the first security region 206 (FIG. 2)) are authorized for transfer. In some embodiments, the device may be located at the first security region. The device may be part of a private network in some embodiments. Further, the device may comprise a cryptographic appliance in some embodiments. In some embodiments, 402 may be omitted.

In 404, the network may configure a second device (such as the second device 128 and/or the second device 218) for verification. In particular, the network may configure the second device with one or more signatures for verification of one or more signatures of the workload. For example, the second device may be configured to verify, based on one or more signatures, that workloads being transferred to or from the second security region (such as the second security region 104 (FIG. 1) and/or the second security region 210 (FIG. 2)) are authorized for transfer. In some embodiments, the second device may be located at the second security region. The second device may be part of a private network in some embodiments, where the private network may be the same private network that includes the device. Further, the second device may comprise a second cryptographic appliance in some embodiments. In some embodiments, 404 may be omitted.

In 406, the network may receive a workload from the first security region. In particular, the network may receive, via the device of the network, the workload from the first security region of a CSP. In some embodiments, the first security region may be part of a first air gapped network. Further, the first security region may be located in a first realm (such as the first realm 202 (FIG. 2)) in some embodiments.

In 408, the network may verify one or more signatures. In particular, the network may verify, via the device, one or more signatures of the workload. The one or more signatures may include at least one signature associated with the first security region and at least one signature associated with the second security region.

In 410, the network may encrypt the workload. In particular, the network may encrypt, via the device, the workload based at least in part on the one or more signatures of the workload being verified.

In 412, the network may transmit the encrypted workload. In particular, the network may transmit, via the device, the encrypted workload to the second security region of the CSP. The second security region may be part of a second air gapped network. In some embodiments, transmitting the encrypted workload may include transmitting the encrypted workload via a private network connection.

In 414, the network may receive the encrypted workload. In particular, the network may receive, via the second device, the encrypted workload from the device. In some embodiments, 414 may be omitted.

In 416, the network may verify the one or more signatures. In particular, the network may verify, the second device, the one or more signatures of the workload. The network may verify, via the second device, that the one or more signatures authorize transfer of the workload from the first security region to the second security region. In some embodiments, 416 may be omitted.

In 418, the network may decrypt the encrypted workload. In particular, the network may decrypt, via the second device, the encrypted workload based at least in part on the one or more signatures being verified by the second device. In some embodiments, 418 may be omitted.

In 420, the network may provide the workload to the second security region. In particular, the network may provide, via the second device, the workload to the second security region. The network may provide the workload to the second security region for storage within the second security region. In some embodiments, 420 may be omitted.

Figure 5:
FIG. 5 illustrates another example procedure for providing a workload from a first security region of a CSP to a second security region of the CSP in accordance with some embodiments.
Figure 5:
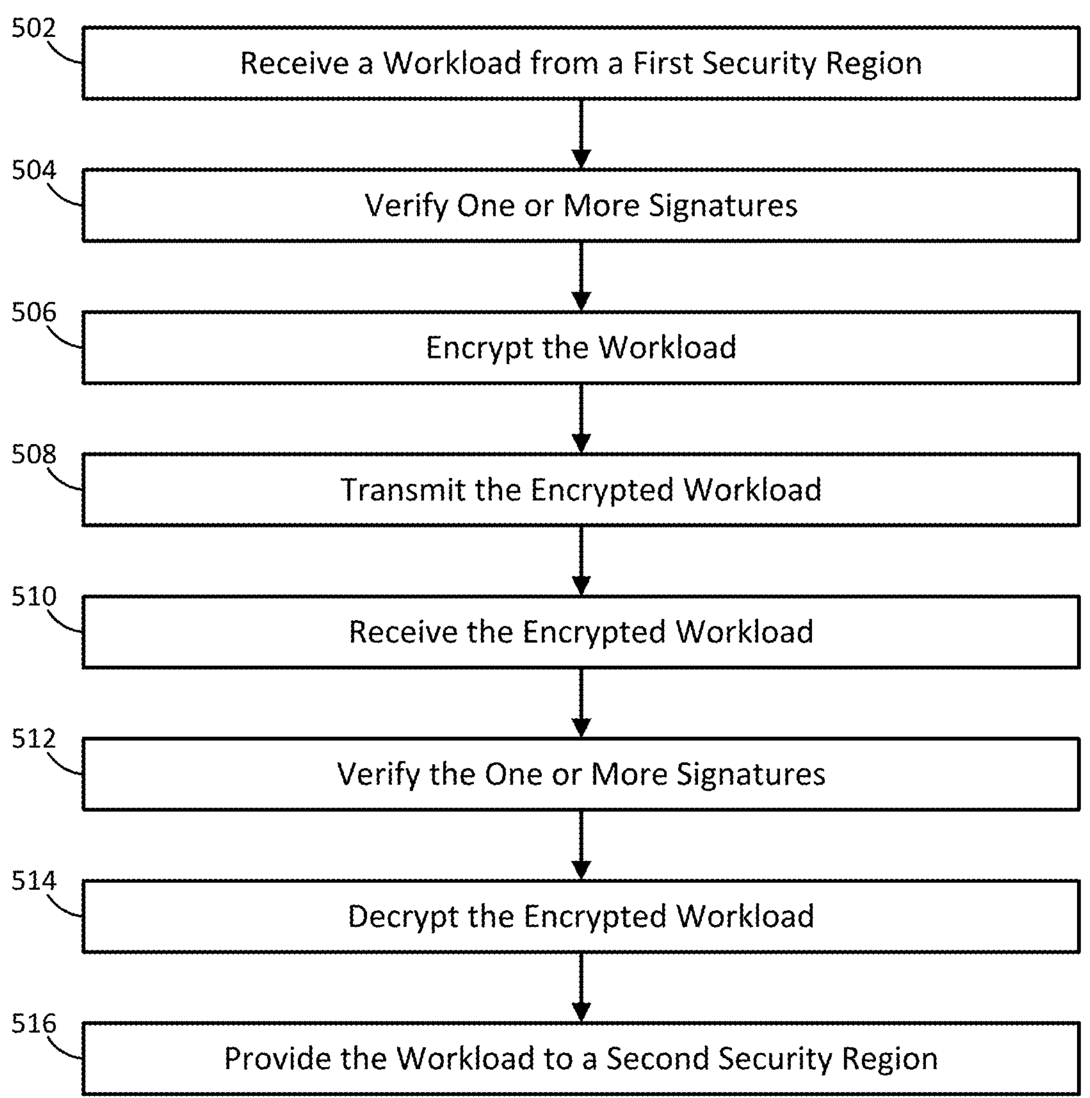

FIG. 5 illustrates another example procedure 500 for providing a workload from a first security region of a CSP to a second security region of the CSP in accordance with some embodiments. This process (e.g., procedure 500) is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process. The procedure 500 may be performed by a private network (such as the customer equipment 118 (FIG. 1)) or some portion thereof. For example, the procedure 500 may be performed by one or more devices (such as the first device 126 (FIG. 1), the second device 128 (FIG. 2), the first device 214 (FIG. 2), and/or the second device 218 (FIG. 2)).

In 502, the network may receive a workload from a first security region (such as the first security region 102 (FIG. 1) and/or the first security region 206 (FIG. 2)). The network may include a private network connection connected between the first security region of a CSP and the second security region of the CSP. The network may further include a device coupled to the private network connection and located at the first security region. The device may receive the workload from the first security region. The first security region may be part of a first air gapped network. Further, the first security region may be located in a first realm (such as the first realm 202 (FIG. 2)).

In 504, the network may verify one or more signatures. In particular, the device of the network may verify one or more signatures of the workload. The one or more signatures may include at least one signature associated with the first security region and at least one signature associated with the second security region. The device may verify that the one or more signatures authorize transfer of the workload from the first security region to the second security region.

In 506, the network may encrypt the workload. In particular, the device of the network may encrypt the workload based at least in part on the one or more signatures of the workload being verified.

In 508, the network may transmit the encrypted workload. In particular, the device of the network may transmit the encrypted workload to the second security region. The second security region may be part of a second air gapped network. Further, the second security region may be located in a second realm (such as the second realm 204 (FIG. 2)).

In 510, the network may receive the encrypted workload. The network may include a second device in some embodiments, where the second device may be coupled to the private network connection and located at the second security region. The second device may receive the encrypted workload from the device. In some embodiments, 510 may be omitted.

In 512, the network may verify the one or more signatures. In particular, the second device may verify the one or more signatures of the encrypted workload. The second device may verify that the one or more signatures authorize transfer of the workload from the first security region to the second security region. In some embodiments, 512 may be omitted.

In 514, the network may decrypt the encrypted workload. In particular, the second device may decrypt the encrypted workload based on one or more of the signatures being verified by the second device. In some embodiments, 514 may be omitted.

In 516, the network may provide the workload to the second security region. In particular, the second device may provide the workload to the second security region. The second device may provide the workload to the second security region for storage within the second security region. In some embodiments, 516 may be omitted.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway 636 of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
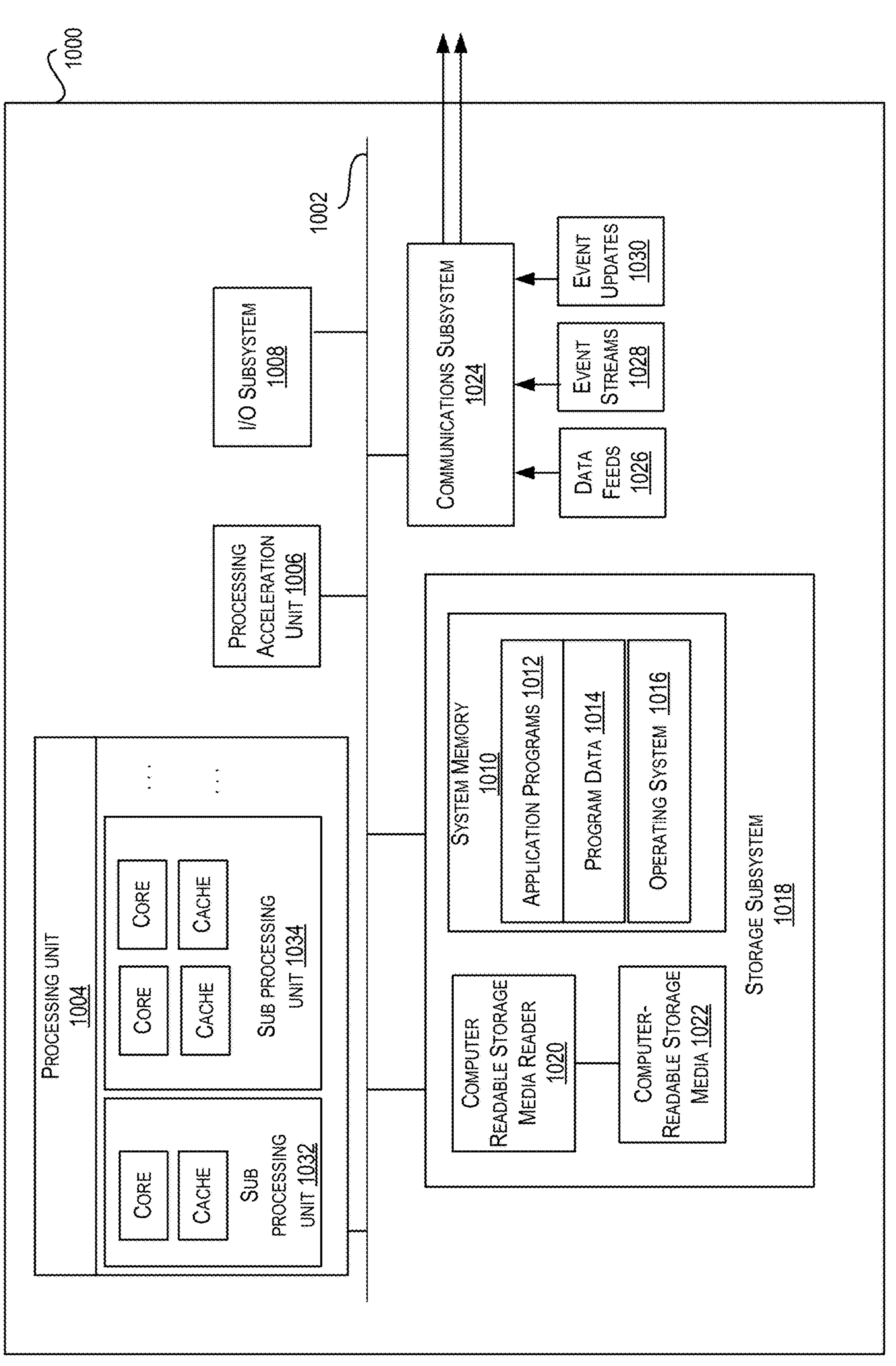
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for receiving a workload by a first security region of a cloud service provider (CSP) from a second security region of the cloud service provider, comprising:

receiving, via a device, an indication of signatures for verification of authorization of a transfer, the indication of signatures indicating signatures, the signatures comprising at least one signature associated with the first security region and at least one signature associated with the second security region;

receiving, via the device, an encrypted workload from the second security region; and comparing one or more signatures of the encrypted workload with the signatures from the indication of signatures to determine whether transmission of the encrypted workload is authorized.

2. The method of claim 1, further comprising:

determining that the transmission of the encrypted workload is authorized based at least in part on the comparing the one or more signatures of the encrypted workload with the signatures from the indication of signatures;

decrypting the encrypted workload to produce a decrypted workload based at least in part on the determining that the transmission of the encrypted workload is authorized; and providing the decrypted workload to the first security region for storage.

3. The method of claim 1, further comprising:

determining that the transmission of the encrypted workload is unauthorized based at least in part on the comparing the one or more signatures of the encrypted workload with the signatures from the indication of signatures; and preventing the encrypted workload from being provided to the first security region based at least in part on the determining that the transmission of the encrypted workload is unauthorized.

4. The method of claim 1, wherein the indication of the signatures is received in a policy statement, wherein the policy statement includes an indication of regions between which workloads are authorized to be transferred, and wherein the transmission of the encrypted workload is authorized is further based on whether the policy statement indicates that workloads are authorized to be transferred between the first security region and the second security region.

5. The method of claim 1, further comprising:

comparing the one or more signatures of the encrypted workload with a signature of an object store of the first security region, wherein whether the transmission of the encrypted workload is authorized is determined further based on the comparing the one or more signatures of the encrypted workload with the signature of the object store.

6. The method of claim 1, further comprising:

comparing the one or more signatures of the encrypted workload with a signature of a customer replication tenancy of the first security region, wherein whether the transmission of the encrypted workload is authorized is determined further based on the comparing the one or more signatures of the encrypted workload with the signature of the customer replication tenancy.

7. The method of claim 1, wherein the encrypted workload includes data from a first isolated partition of the cloud service provider, and wherein the device is to store a decrypted workload corresponding to the encrypted workload in a second isolated partition of the cloud service provider if the transmission of the encrypted workload is authorized.

8. The method of claim 1, wherein the device is a first device, and wherein the method further comprise:

receiving, via the first device from a second device, a configuration for determining authorization of transmissions; and determining whether the transmission of the encrypted workload is authorized based at least in part on the configuration.

9. One or more non-transitory computer-readable media having instructions stored thereon, wherein the instructions, when executed by a device of a network, cause the device to:

receive an indication of signatures for verification of authorization of a transfer, the indication of signatures indicating signatures, the signatures comprising at least one signature associated with a first security region of a cloud service provider (CSP) and at least one signature associated with a second security region of the cloud service provider;

receive an encrypted workload from the second security region; and compare one or more signatures of the encrypted workload with the signatures from the indication of signatures to determine whether transmission of the encrypted workload is authorized.

10. The one or more non-transitory computer-readable media of claim 9, wherein the instructions, when executed by the device, further cause the device to:

determine that the transmission of the encrypted workload is authorized based at least in part on the comparison of the one or more signatures of the encrypted workload with the signatures from the indication of signatures;

decrypt the encrypted workload to produce a decrypted workload based at least in part on the determination that the transmission of the encrypted workload is authorized; and provide the decrypted workload to the first security region for storage.

11. The one or more non-transitory computer-readable media of claim 9, wherein the instructions, when executed by the device, further cause the device to:

determine that the transmission of the encrypted workload is unauthorized based at least in part on the comparison of the one or more signatures of the encrypted workload with the signatures from the indication of signatures; and prevent the encrypted workload from being provided to the first security region based at least in part on the determination that the transmission of the encrypted workload is unauthorized.

12. The one or more non-transitory computer-readable media of claim 9, wherein the indication of the signatures is received in a policy statement, wherein the policy statement includes an indication of regions between which workloads are authorized to be transferred, and wherein the transmission of the encrypted workload is authorized is further based on whether the policy statement indicates that workloads are authorized to be transferred between the first security region and the second security region.

13. The one or more non-transitory computer-readable media of claim 9, wherein the instructions, when executed by the device, further cause the device to:

compare the one or more signatures of the encrypted workload with a signature of an object store of the first security region, wherein whether the transmission of the encrypted workload is authorized is determined further based on the comparison of the one or more signatures of the encrypted workload with the signature of the object store.

14. The one or more non-transitory computer-readable media of claim 9, wherein the instructions, when executed by the device, further cause the device to:

compare the one or more signatures of the encrypted workload with a signature of a customer replication tenancy of the first security region, wherein whether the transmission of the encrypted workload is authorized is determined further based on the comparison of the one or more signatures of the encrypted workload with the signature of the customer replication tenancy.

15. The one or more non-transitory computer-readable media of claim 9, wherein the encrypted workload includes data from a first isolated partition of the cloud service provider, and wherein the device is to store a decrypted workload corresponding to the encrypted workload in a second isolated partition of the cloud service provider if the transmission of the encrypted workload is authorized.

16. The one or more non-transitory computer-readable media of claim 9, wherein the device is a first device, and wherein the instructions, when executed by the first device, further cause the first device to:

receive, from a second device, a configuration for determining authorization of transmissions; and determine whether the transmission of the encrypted workload is authorized based at least in part on the configuration.

17. A private network, comprising:

a private network connection connected between a first security region of a cloud service provider (CSP) and a second security region of the cloud service provider; and a device coupled to the private network connection and located at the first security region, the device to:

receive an indication of signatures for verification of authorization of a transfer, the indication of signatures indicating signatures, the signatures comprising at least one signature associated with the first security region and at least one signature associated with the second security region;

receive an encrypted workload from the second security region; and compare one or more signatures of the encrypted workload with the signatures from the indication of signatures to determine whether transmission of the encrypted workload is authorized.

18. The private network of claim 17, wherein the device is further to:

determine that the transmission of the encrypted workload is authorized based at least in part on the comparison of the one or more signatures of the encrypted workload with the signatures from the indication of signatures;

decrypt the encrypted workload to produce a decrypted workload based at least in part on the determination that the transmission of the encrypted workload is authorized; and provide the decrypted workload to the first security region for storage.

19. The private network of claim 17, wherein the device is further to:

determine that the transmission of the encrypted workload is unauthorized based at least in part on the comparison of the one or more signatures of the encrypted workload with the signatures from the indication of signatures; and prevent the encrypted workload from being provided to the first security region based at least in part on the determination that the transmission of the encrypted workload is unauthorized.

20. The private network of claim 17, wherein the indication of the signatures is received in a policy statement, wherein the policy statement includes an indication of regions between which workloads are authorized to be transferred, and wherein the transmission of the encrypted workload is authorized is further based on whether the policy statement indicates that workloads are authorized to be transferred between the first security region and the second security region.

* * * * *